US009994748B2

(12) United States Patent
Asano et al.

(10) Patent No.: US 9,994,748 B2
(45) Date of Patent: Jun. 12, 2018

(54) POLISHING COMPOSITION

(71) Applicant: FUJIMI INCORPORATED, Kiyosu-shi, Aichi (JP)

(72) Inventors: Hiroshi Asano, Kiyosu (JP); Maiko Asai, Kiyosu (JP); Hitoshi Morinaga, Kiyosu (JP); Kazusei Tamai, Kiyosu (JP)

(73) Assignee: FUJIMI INCORPORATED, Kiyosu-Shi (JP)

( * ) Notice: Subject to any disclaimer, the term of this patent is extended or adjusted under 35 U.S.C. 154(b) by 139 days.

(21) Appl. No.: 14/910,839

(22) PCT Filed: Jul. 17, 2014

(86) PCT No.: PCT/JP2014/069051
§ 371 (c)(1),
(2) Date: Feb. 8, 2016

(87) PCT Pub. No.: WO2015/019820
PCT Pub. Date: Feb. 12, 2015

(65) Prior Publication Data
US 2016/0186029 A1    Jun. 30, 2016

(30) Foreign Application Priority Data

Aug. 9, 2013 (JP) ................. 2013-166945

(51) Int. Cl.
*C09K 3/14* (2006.01)
*B24B 37/00* (2012.01)
*B24B 1/00* (2006.01)
*C09G 1/02* (2006.01)

(52) U.S. Cl.
CPC .............. *C09K 3/1436* (2013.01); *B24B 1/00* (2013.01); *B24B 37/00* (2013.01); *C09G 1/02* (2013.01); *C09K 3/1445* (2013.01)

(58) Field of Classification Search
CPC ...... C09K 3/1436; C09K 3/1445; B24B 1/00; B24B 37/00; C09G 1/02
USPC ....................................... 451/59
See application file for complete search history.

(56) References Cited

U.S. PATENT DOCUMENTS

| 6,123,603 | A | 9/2000 | Tada et al. |
| 6,310,024 | B1* | 10/2001 | Gill ........................... C02F 1/70 510/218 |
| 6,426,155 | B1 | 7/2002 | Tada et al. |
| 2005/0050803 | A1 | 3/2005 | Amanokura et al. |
| 2007/0232197 | A1 | 10/2007 | Amanokura et al. |
| 2009/0156007 | A1* | 6/2009 | Amanokura ............ C09G 1/02 438/693 |
| 2009/0289217 | A1* | 11/2009 | Sato ........................ C09G 1/02 252/79.4 |
| 2012/0064721 | A1 | 3/2012 | Amanokura et al. |
| 2014/0308155 | A1 | 10/2014 | Morinaga et al. |
| 2016/0186029 | A1* | 6/2016 | Asano .................... B24B 37/00 451/59 |

FOREIGN PATENT DOCUMENTS

| JP | H 01-246068 A | 10/1989 |
| JP | H 11-010492 A | 1/1999 |
| JP | 2005-223260 A | 8/2005 |
| JP | 2007-070548 A | 3/2007 |
| JP | 2011-205113 A | 10/2011 |
| WO | WO 2013/077281 A1 | 5/2013 |

OTHER PUBLICATIONS

Chinese Office Action dated Nov. 11, 2016 as issued in corresponding Chinese Application No. 201480044100.2 and its English translation thereof.
Chinese Office Action dated Apr. 19, 2017 as issued in corresponding Chinese Application No. 201480044100.2 and its English translation thereof.
Chinese Office Action dated Aug. 24, 2017 as issued in corresponding Chinese Application No. 201480044100.2 and its English translation thereof.
Japanese Office Action dated Dec. 26, 2017 as issued in corresponding Application No. 2015-530778 and its English translation thereof.

* cited by examiner

*Primary Examiner* — George Nguyen

(74) *Attorney, Agent, or Firm* — Foley & Lardner LLP

(57) ABSTRACT

[Problem] An object is to provide a polishing composition which can improve smoothness of a surface of an alloy material to obtain a highly glossy surface, and can obtain a high-quality mirror surface having significantly reduced scratches or the like.

[Solution] There is provided a polishing composition which is used for polishing an alloy material, and which comprises abrasive grains and an additive which does not form a complex with specific metal species and is adsorbed on a surface of the alloy to exhibit an anticorrosive effect.

7 Claims, No Drawings

POLISHING COMPOSITION

TECHNICAL FIELD

The present invention relates to a polishing composition.

BACKGROUND ART

Generally, an alloy is a eutectic body of one member of metal element, and one or more members of other metal elements or a nonmetallic element such as carbon, nitrogen, or silicon. Generally, an alloy is produced for making properties such as mechanical strength, chemical resistance, corrosion resistance, and heat resistance higher than those of pure metal.

Among various alloys, an aluminum alloy has a light weight and excellent strength, and therefore is used for various applications such as structural materials including building materials and containers, transportation equipment including automobiles, ships, and aircrafts, various electric appliances, and electronic parts. A titanium alloy has a light weight and excellent corrosion resistance, and therefore is widely used for precision instruments, ornaments, tools, sporting goods, medical components, and the like. Stainless steel which is an iron-based alloy, or a nickel alloy, has excellent corrosion resistance, and therefore is used for various applications such as structural materials, transportation equipment, tools, machinery, cookware, and the like. A copper alloy has excellent electrical conductivity, thermal conductivity, corrosion resistance, and processability, and beautiful final conditions, and therefore is widely used for ornaments, eating utensils, musical instruments, and parts of electric materials, and the like.

A surface of an alloy is required to be mirror-finished according to an application. As a method of mirror-finishing, the surface of an alloy is painted or coated. However, if mirror-finishing can be realized by polishing the surface of an alloy, more advantages than painting or coating can be obtained. For example, polishing can provide a better mirror surface than painting, and therefore does not require a painting step or a coating step, and materials used therefor. Furthermore, a mirror surface obtained by polishing has higher durability than a mirror surface obtained by painting, and therefore is maintained for a long time.

Conventionally, mirror-finishing of a surface or smoothing thereof by polishing has been tried (for example, refer to Patent Literatures 1 and 2). However, it is not possible to obtain a higher-quality mirror surface by these methods. Particularly, when an alloy in which a main component and an element having a different hardness from the main component are mixed is polished, various defects such as projections, recesses, or flaws (so-called scratches) are generated on the surface of alloy after polishing. Therefore, it is difficult to obtain a highly mirror-finished alloy by polishing.

CITATION LIST

Patent Literatures

Patent Literature 1: JP H01-246068 A
Patent Literature 2: JP H11-010492 A

SUMMARY OF INVENTION

Technical Problem

An object of the present invention is to provide a polishing composition which can improve smoothness of a surface of an alloy material to obtain a highly glossy surface, and can obtain a high-quality mirror surface having significantly reduced scratches or the like.

Solution to Problem

The above-described object is solved by providing a polishing composition which is used for polishing an alloy material, and includes abrasive grains and an additive which does not form a complex with specific metal species and is adsorbed on a surface of the alloy to exhibit an anticorrosive effect.

Advantageous Effect of Invention

The present invention can provide a polishing composition which can improve smoothness of a surface of an alloy material to obtain a highly glossy surface, and can obtain a high-quality mirror surface having significantly reduced scratches or the like. When the polishing composition of the present invention is used for polishing an alloy material, it is also possible to maintain a high polishing speed sufficiently with respect to the alloy material.

DESCRIPTION OF EMBODIMENTS

Hereinafter, embodiments of the present invention will be described. The present invention is not limited only to the following embodiments. Unless otherwise specified, an operation or measurement of physical properties or the like is performed under the conditions of room temperature (20° C. or higher and 25° C. or lower) /relative humidity of 40% or more and 50% or less.

The present invention is a polishing composition which is used for polishing an alloy material, and includes abrasive grains and an additive which does not form a complex with specific metal species and is adsorbed on a surface of the alloy to exhibit an anticorrosive effect.

As described above, when an alloy in which a main component and an element having a different hardness from the main component are mixed is polished, various defects such as projections, recesses, or flaws (so-called scratches) are generated on a surface of the alloy, and it is difficult to obtain a highly mirror-finished alloy by polishing. Particularly, when an inspection is performed with recent severe inspection standards, a conventional polishing composition does not meet a request of high quality. More plainly, for example, even when a polishing composition which is thought to be able to provide a high-quality polished substance without visually recognizing scratches under a fluorescent lamp, is used, scratches may be observed in a polished surface when the polished surface is irradiated with halogen light in a dark room. A polishing composition which can obtain a high-quality mirror surface having reduced scratches even under such severe inspection conditions, has been desired.

According to the polishing composition of the present invention, it is possible to improve smoothness of a surface of an alloy material to obtain a highly glossy surface, and can obtain a high-quality mirror surface having significantly reduced scratches or the like.

Next, a configuration of the polishing composition of the present invention will be described in detail.

[Alloy Material]

The polishing composition according to the present invention is used for polishing an alloy material. The alloy material includes a metal species as a main component and a metal species different from the main component. A method for manufacturing the alloy material is not particularly limited, but, for example, the alloy material is preferably obtained by casting, forging, or rolling.

The alloy material is named based on a metal species as a main component. Examples of the alloy material include an aluminum alloy, a titanium alloy, an iron alloy (stainless steel), a nickel alloy, and a copper alloy. The main component of the alloy material is preferably at least one member selected from the group consisting of aluminum, titanium, iron, nickel, and copper. More preferably, an alloy material contains aluminum as a main component thereof.

The aluminum alloy contains aluminum as a main component, and contains, for example, at least one member selected from the group consisting of silicon, iron, copper, manganese, magnesium, zinc, and chromium as a metal species different from the main component. The content of the metal species different from the main component in the aluminum alloy is, for example, 0.1% by mass or more and 25% by mass or less with respect to the total amount of the alloy material.

According to another embodiment, the main component of the alloy material is aluminum, and at least one member of metal element selected from the group consisting of silicon, magnesium, iron, copper, and zinc is included at a content of 0.5% by mass or more and 20% by mass or less with respect to the total amount of the alloy material.

Examples of the aluminum alloy include, in the alloy number described in JIS H4000:2006, 1085, 1080, 1070, 1050, 1050A, 1060, 1100, 1200, 1N00, 1N30, 2014, 2014A, 2017, 2017A, 2219, 2024, 3003, 3103, 3203, 3004, 3104, 3005, 3105, 5005, 5021, 5042, 5052, 5652, 5154, 5254, 5454, 5754, 5082, 5182, 5083, 5086, 5N01, 6101, 6063, 6061, 6082, 7010, 7075, 7475, 7178, 7N01, 8021, and 8079. Examples of the aluminum alloy include, in the alloy number described in JIS H4040:2006, 1070, 1060, 1050, 1050A, 1100, 1200, 2011, 2014, 2014A, 2017, 2017A, 2117, 2024, 2030, 2219, 3003, 3103, 5N02, 5050, 5052, 5454, 5754, 5154, 5086, 5056, 5083, 6101, 6N01, 6005A, 6060, 6061, 6262, 6063, 6082, 6181, 7020, 7N01, 7003, 7050, 7075, and 7049A. Examples of the aluminum alloy include, in the alloy number described in JIS H4100:2006, 1070 A1070S, 1060A1060S, 1050 A1050S, 1100 A1100S, 1200 A1200S, 2014 A2014S, 2014 A2014AS, 2017 A2017S, 2017 A2017AS, 2024 A2024S, 3003 A3003S, 3203A 3203S, 5052 A5052S, 5454 A5454S, 5083 A5083S, 5086 A5086S, 6101 A6101S, 6N01 A6NO1S, 6005AA6005AS, 6060 A6060S, 6061 A6061S, 6063 A6063S, 6082 A6082S, 7N01 A7N01S, 7003 A7003S, 7005A 7005S, 7020 A7020S, 7050 A7050S, and 7075 A7075S.

The titanium alloy contains titanium as a main component, and contains, for example, aluminum, iron, or vanadium as a metal species different from the main component. The content of the metal species different from the main component in the titanium alloy is, for example, 3.5% by mass or more and 30% by mass or less with respect to the total amount of the alloy material. Examples of the titanium alloy include, in the type described in JIS H4600:2012, types 11 to 23, type 50, type 60, type 61, and type 80.

The stainless steel contains iron as a main component, and contains, for example, at least one member selected from the group consisting of chromium, nickel, molybdenum, and manganese as a metal species different from the main component. The content of the metal species different from the main component in the stainless steel is, for example, 10% by mass or more and 50% by mass or less with respect to the total amount of the alloy material. Examples of the stainless steel include, in the symbol of the type described in JIS G4303:2005, SUS201, 303, 303Se, 304, 304L, 304NI, 305, 305JI, 309S, 310S, 316, 316L, 321, 347, 384, XM7, 303F, 303C, 430, 430F, 434, 410, 416, 420J1, 420J2, 420F, 420C, and 631J1.

The nickel alloy contains nickel as a main component, and contains, for example, at least one member selected from iron, chromium, molybdenum, and cobalt as a metal species different from the main component. The content of the metal species different from the main component in the nickel alloy is, for example, 20% by mass or more and 75% by mass or less with respect to the total amount of the alloy material. Examples of the nickel alloy include, in the alloy number described in JIS H4551:2000, NCF600, 601, 625, 750, 800, 800H, 825, NW0276, 4400, 6002, and 6022.

The copper alloy contains copper as a main component, and contains, for example, at least one member selected from iron, lead, zinc, and tin as a metal species different from the main component. The content of the metal species different from the main component in the copper alloy is, for example, 3% by mass or more and 50% by mass or less with respect to the total amount of the alloy material. Examples of the copper alloy include, in the alloy number described in JIS H3100:2006, C2100, 2200, 2300, 2400, 2600, 2680, 2720, 2801, 3560, 3561, 3710, 3713, 4250, 4430, 4621, 4640, 6140, 6161, 6280, 6301, 7060, 7150, 1401, 2051, 6711, and 6712.

The present inventors have found that scratches are easily generated by polishing in an alloy material containing a relatively large amount of metal species different from the main component. A mechanism of easily generating the scratches is as follows. That is, a metal species having a higher hardness than the main component is selected as the metal species different from the main component, and when the metal species different from the main component is dropped off during polishing, a surface of the main component is damaged and the damage appears as scratches. Therefore, it is considered that the larger an existence ratio of the metal species different from the main component is, the higher a generation ratio of the scratches is. In this point, according to the polishing composition of the present invention, even when an alloy material containing a relatively large amount of metal species different from the main component is polished, surprisingly, it is easy to obtain a polished surface with fewer scratches. A mechanism of easily obtaining a polished surface with fewer scratches is as follows. That is, the polishing composition of the present invention does not form a complex with specific metal species and is adsorbed on a surface of an alloy. Therefore, the polishing composition exhibits an anticorrosive effect and can obtain a polished surface with fewer scratches. In addition, the polishing composition does not lower a polishing speed.

Needless to say, the polishing composition exhibits an effect of significantly reducing scratches or the like also in a form of an alloy material not containing a large amount of metal species different from the main component. This is because a metal species different from the main component is contained also in this form and generation of scratches caused thereby can be reduced.

[Abrasive Grains]

The abrasive grains are preferably made of silicon oxide (silica), aluminum oxide, cerium oxide, zirconium oxide, titanium oxide, manganese oxide, silicon carbide, or silicon nitride. Among these compounds, silicon oxide (silica) is preferable. Specific examples thereof include colloidal silica, fumed silica, and sol-gel method silica. Among them, fumed silica or colloidal silica is preferable from a viewpoint of obtaining smoothness of a surface of an alloy more efficiently.

Examples of a method for manufacturing colloidal silica include known methods. Examples thereof include a method by hydrolysis of alkoxysilane described in pages 154-156 in "Sol—gel method science" written by Sumio Sakuka (published by Agne Shofusha); a method of reacting methyl silicate with water by dropwise adding methyl silicate or a mixture of methyl silicate and methanol into a mixed solvent consisting of water, methanol, and ammonia or ammonia and an ammonium salt, described in JP H11-60232 A; a method of polymerizing silicic acid to make particles grow by hydrolyzing alkyl silicate with an acid catalyst and then adding an alkali catalyst thereto and heating the resulting mixture, described in JP 2001-48520 A; and a method of using a specific kind of hydrolysis catalyst in a specific amount in hydrolyzing alkoxysilane, described in JP 2007-153732 A. Examples thereof also include a manufacturing method by ion-exchanging sodium silicate.

Examples of a method for manufacturing fumed silica include a known method of vaporizing silicon tetrachloride and using a gas phase reaction to burn silicon tetrachloride in an oxyhydrogen flame. Fumed silica can be an aqueous dispersion liquid by a known method. Examples for making the aqueous dispersion liquid include methods described in JP 2004-43298 A, JP 2003-176123 A, and JP-2002-309239 A.

The average aspect ratio of primary particles of abrasive grains (particularly, silica particles) in the polishing composition is preferably 1.10 or more.

An alloy material which is a polishing object in the present invention includes a solid solution of a metal element having a different hardness from the main component. Therefore, there is a difference in a polishing speed in polishing between a part containing the element and a part not containing the element. Therefore, various defects such as projections or recesses caused by the difference in the polishing speed, or scratches caused by polishing a part containing an element having a high hardness, are generated on a surface of the alloy material after polishing. Therefore, it was difficult to obtain a highly glossy surface (mirror surface) by polishing these alloy materials.

On the other hand, when the average aspect ratio of primary particles is 1.10 or more, which is a preferable embodiment, it is possible to obtain a highly glossy surface while a high polishing speed with respect to the alloy material is sufficiently maintained and smoothness of a surface of the alloy material is improved. Conventionally, the following opinion is general. That is, when polishing is performed using particles having a high aspect ratio, the particles are less easily brought into contact with a surface of a polishing object smoothly than particles having a low aspect ratio. Therefore, surface roughness is deteriorated. However, by using silica particles having a high aspect ratio, a friction force or a mechanical force with respect to the alloy material is increased. Therefore, as a result, it is easy to uniformly polish the alloy material having a non-uniform material, hardness, or state of the surface. Therefore, it is considered that surface roughness is reduced. The average aspect ratio is more preferably 1.12 or more. The upper limit of the average aspect ratio is not particularly limited, but is about 3.0.

The average aspect ratio is an average of values obtained by dividing a length of a long side of the smallest rectangle circumscribed to an image of silica particles by a scanning electron microscope, by a length of a short side of the same rectangle, and can be determined using a general image analysis software.

The average primary particle diameter of abrasive grains included in the polishing composition is preferably 5 nm or more, more preferably 10 nm or more, still more preferably 15 nm or more, particularly preferably 40 nm or more. When the average primary particle diameter of the abrasive grains is within the above range, a polishing speed of the alloy material is improved. The average primary particle diameter of the abrasive grains included in the polishing composition is preferably 400 nm or less, more preferably 300 nm or less, still more preferably 200 nm or less, particularly preferably 100 nm or more, most preferably 60 nm or less. When the average primary particle diameter of the abrasive grains is within the above range, it is easy to obtain a surface having less defects and a smaller surface roughness degree. When residual abrasive grains having a large particle diameter in the alloy material after polishing cause a problem, abrasive grains not having a large particle diameter but having a small particle diameter are preferably used. The average particle diameter of the abrasive grains can be calculated from a measured value of a specific surface area by a nitrogen adsorption method (BET method). More specifically, the average particle diameter of the abrasive grains can be determined by a method described in Examples.

The content of the abrasive grains in the polishing composition is preferably 1% by mass or more, more preferably 2% by mass or more, still more preferably 10% by mass or more. When the content of the abrasive grains is within the above range, a speed of polishing the alloy by the polishing composition is improved. The content of the abrasive grains in the polishing composition is preferably 50% by mass or less, more preferably 40% by mass or less, still more preferably 30% by mass or less. When the content of the abrasive grains is within the above range, cost for manufacturing the polishing composition is reduced, and it is easy to obtain a polished surface with less scratches. In addition, an amount of residual abrasive grains on a surface of the alloy after polishing is reduced, and cleanliness of the surface of the alloy is improved.

[Additive]

The additive in the present invention is characterized in that the additive does not form a complex with specific metal species, and is adsorbed on a surface of the alloy to exhibit an anticorrosive effect.

Regarding the additive which does not form a complex with specific metal species, and is adsorbed by a surface of the alloy to exhibit an anticorrosive effect, an additive not forming a complex with specific metal species can be obtained by selecting an additive which does not form a complex within such a range to be able to be determined from a molecular structure and a metal species to be polished. As for being adsorbed on the surface of the alloy to exhibit an anticorrosive effect, it is indicated that corrosion of the surface of metal by the polishing composition can be reduced by an additive adsorbed on the surface of the alloy to be polished. For example, it can be confirmed that an additive exhibits an anticorrosive effect by confirming that the additive actually exhibits an anticorrosive effect by performing an immersion test, specifically by a method described in Examples.

Specific examples of the additive in the present invention are not particularly limited as long as the additive does not form a complex with specific metal species, and is adsorbed on the surface of the alloy to exhibit an anticorrosive effect. Preferable examples thereof include a surfactant, alcohols, a macromolecule, and a resin. The additive in the present invention is preferably dissolved in water.

The kind of the surfactant is not particularly limited as long as the surfactant has the above characteristics, but is preferably a nonionic surfactant from a viewpoint of exhibiting the intended effects of the present invention efficiently. The kind of the surfactant is not particularly limited as long as the surfactant does not form a complex with specific metal species, and is adsorbed on a surface of an alloy to exhibit an anticorrosive effect. Preferable examples thereof include a nonionic surfactant having three or more hydrocarbon groups in succession. In a preferable embodiment, polyoxyalkylene ether is preferable, polyoxyalkylene ether having a hydrophobic portion is more preferable, and polyoxyalkylene ether having a specific hydrophobic portion (substituted or nonsubstituted alkyl group or aryl group having a carbon number of 5 or more and 29 or less) is particularly preferable.

A technical meaning of such carbon number of 5 or more and 29 or less is that solubility and an effect of suppressing scratches are advantageously improved within such a range. Such carbon number is preferably 6 or more and 25 or less, more preferably 7 or more and 24 or less, still more preferably 8 or more and 23 or less, further still more preferably 9 or more and 20 or less, particularly preferably 10 or more and 15 or less. When the carbon number of the alkyl group is within a preferable range, it is possible to reduce generation of scratches by adsorption onto the surface of the alloy. When the carbon number of the alkyl group is within a more preferable range or a particularly preferable range, it is possible to reduce the number of scratches surprisingly.

The alkyl group having a carbon number of 5 or more and 29 or less may be any one of linear, branched, or cyclic. Examples thereof include a pentyl group, a hexyl group, a heptyl group, an octyl group, a nonyl group, a decyl group, a undecyl group, a dodecyl group, tridecyl group, a tetradecyl group, a pentadecyl group, a hexadecyl group (cetyl group), a heptadecyl group, an octadecyl group (stearyl group), a nonadecyl group, an icosyl group, an eicosyl group, a henicosyl group, a heneicosyl group, a docosyl group, a tricosyl group, a tetracosyl group, a pentacosyl group, a hexacosyl group, a heptacosyl group, an octacosyl group, a nonacosyl group, an isopropyl group, an isobutyl group, a sec-butyl group, a tert-butyl group, an isopentyl group, a tert-pentyl group, a neopentyl group, an isohexyl group, a 2-ethylhexyl group, a cyclopropyl group, a cyclobutyl group, a cyclopentyl group, a cyclohexyl group, a cycloheptyl group, and a cyclooctyl group.

Examples of the substituent in the substituted alkyl group having a carbon number of 5 or more and 29 or less include an alkenyl group having a carbon number of 2 or more and 10 or less, a cumyl group, a halogen atom, and an aryl group having a carbon number of 5 or more and 29 or less. Preferable specific examples of the aryl group having a carbon number of 5 or more and 29 or less include the following.

Examples of the aryl group having a carbon number of 5 or more and 29 or less include a polycyclic phenyl group, a phenyl group, a naphthyl group, an anthracenyl group, and a pyrenyl group. Examples of the substituent in the substituted alkyl group having a carbon number of 5 or more and 29 or less include an alkyl group having a carbon number of 5 or more and 29 or less in addition to the above-described substituents. Preferable examples of the alkyl group having a carbon number of 5 or more and 29 or less include the above-described groups.

The above-described polyoxyalkylene ether having a hydrophobic portion is preferably represented below:

[Chemical Formula 1]

$$Z\!-\!O\!-\!(AO)_n H \qquad \text{Formula (1)}$$

In Formula (1),

Z is a hydrophobic portion, and the hydrophobic portion is a substituted or nonsubstituted alkyl group or aryl group having a carbon number of 5 or more and 29 or less, A is an alkylene group having a carbon number of 1 or more and 3 or less, and n is an integer of 1 or more and 50 or less.

Here, in Formula (1), the substituted or nonsubstituted alkyl group or aryl group having a carbon number of 5 or more and 29 or less is as described above. The alkylene group having a carbon number of 1 or more and 3 or less may be linear or branched. Examples thereof include a methylene group, an ethylene group, a trimethylene group, and a propylene group. An ethylene group is particularly preferable in terms of being able to exhibit the intended effects of the present invention efficiently.

n is an integer of 1 or more and 50 or less. n is preferably an integer of 2 or more and 40 or less, more preferably an integer of 3 or more and 30 or less from a viewpoint of dispersion stability. It is preferable within such a range in terms of being able to exhibit the intended effects of the present invention efficiently.

The content of the additive in the polishing composition is preferably 0.01% by mass or more, more preferably 0.05% by mass or more, still more preferably 0.1% by mass or more. When the content of the additive is within the above range, it is possible to suppress scratches effectively. The content of the additive in the polishing composition is preferably 10% by mass or less, more preferably 5% by mass or less, still more preferably 1% by mass or less. When the content of the additive is equal to or more than the above range, stability of a polishing agent may be lowered disadvantageously.

When the additive is a surfactant, a mass average molecular weight (Mw) thereof is preferably 100 or more and 1000000 or less, more preferably 200 or more and 50000 or less, still more preferably 250 or more and 5000 or less.

When the surfactant is used as an additive, the surfactant may be in a form of a salt. Specific examples of the salt include a monovalent or divalent metal salt, an ammonium salt, and an amine salt. Examples of the monovalent or divalent metal salt include a lithium salt, a sodium salt, a potassium salt, a magnesium salt, and a calcium salt. The surfactant may be used singly, or a mixture of two or more kinds thereof may be used.

[pH Adjusting Agent]

The polishing composition of the present invention preferably includes a pH adjusting agent. The pH adjusting agent can adjust the pH of the polishing composition, and can thereby control a polishing speed of an alloy material, dispersibility of abrasive grains, and the like. The pH adjusting agent may be used singly, or a mixture of two or more kinds thereof may be used.

As the pH adjusting agent, a known acid, base, or salt thereof can be used.

Specific examples of the acid which can be used as the pH adjusting agent include inorganic acids such as hydrochloric acid, sulfuric acid, nitric acid, hydrofluoric acid, boric acid, carbonic acid, hypophosphorous acid, phosphorous acid, and phosphoric acid, and organic acids such as formic acid, acetic acid, propionic acid, butyric acid, valeric acid, 2-methylbutyric acid, n-hexanoic acid, 3,3-dimethyl butyric acid, 2-ethyl butyric acid, 4-methyl pentanoic acid, n-heptanoic acid, 2-methyl hexanoic acid, n-octanoic acid, 2-ethylhexanoic acid, benzoic acid, glycolic acid, salicylic acid, glyceric acid, oxalic acid, malonic acid, succinic acid, glutaric acid, adipic acid, pimelic acid, maleic acid, phthalic acid, malic acid, tartaric acid, citric acid, lactic acid, diglycolic acid, 2-furan carboxylic acid, 2,5-furandicarboxylic acid, 3-furan carboxylic acid, 2-tetrahydrofuran carboxylic acid, methoxyacetic acid, methoxy phenyl acetic acid, and phenoxyacetic acid. When the inorganic acid is used as the pH adjusting agent, sulfuric acid, nitric acid, phosphoric acid, or the like is particularly preferable from a viewpoint of improving a polishing speed. When the organic acid is used as the pH adjusting agent, glycolic acid, succinic acid, maleic acid, citric acid, tartaric acid, malic acid, gluconic acid, itaconic acid, or the like is preferable.

Examples of the base which can be used as the pH adjusting agent include amines such as fatty amine and aromatic amine, organic bases such as quaternary ammonium hydroxide, alkali metal hydroxides such as potassium hydroxide, alkaline earth metal hydroxides, and ammonia.

Among these bases, potassium hydroxides or ammonia is preferable from easy availability.

In place of the above-described acid or in combination with the acid, salts such as ammonium salt of the acid and an alkali metal salt thereof can be used as the pH adjusting agent. Particularly, when a combination of a weak acid and a strong base, a strong acid and a weak base, or a weak acid and a weak base, is used, a pH buffering effect can be expected. Moreover when a combination of a strong acid and a strong base is used, it is possible to adjust the electric conductivity as well as the pH by using a small amount thereof.

The addition amount of the pH adjusting agent is not particularly limited, and may be appropriately adjusted such that the polishing composition has a desired pH.

The lower limit of the pH of the polishing composition of the present invention is preferably 2 or more, more preferably 8 or more. The polishing composition having a larger pH makes dispersibility of the abrasive grains (for example, silica particles) better. The upper limit of the pH of the polishing composition of the present invention is preferably 12 or less, more preferably 11.5 or less. The polishing composition having a smaller pH makes safety of the polishing composition higher, and is more preferable from an economic viewpoint.

[Water]

The polishing composition of the present invention preferably contains water as a dispersion medium or a solvent for dispersing or dissolving each component. Water containing impurities as little as possible is preferable from a viewpoint of suppressing inhibition of an action of other components. Specifically, pure water or ultra-pure water obtained by removing impurity ions using an ion exchange resin and then removing foreign matters through a filter, or distilled water is preferable.

[Oxo Acid]

The polishing composition according to the present invention can contain an oxo acid.

The "oxo acid" is also referred to as an oxy acid or an oxygen acid, is an acid in which a hydrogen atom which can be dissociated as a proton ($H^+$) is bonded to an oxygen atom, and is represented by a general formula $XO_n(OH)_m$. Examples of a typical oxo acid include sulfuric acid ($H_2SO_4$), nitric acid ($HNO_3$), and phosphoric acid ($H_3PO_4$), which are inorganic acids not containing a metal element or a semimetal atom. The polishing composition according to the preferable embodiment of the present invention may include an oxo acid "containing a metal element or a semimetal element".

In the present specification, the "metal element" refers to an element showing a metallic property that a simple substance thereof "has a metallic luster, excellent malleability and ductility, and remarkable conductivity of electricity and heat". All the elements conventionally known as a "metal element" are included in this concept. The "semimetal element" is also referred to as a metalloid, and is an element exhibiting an intermediate property between a metal and a non-metal. A strictly unique definition does not exist for the semimetal element. However, in the present specification, the semimetal element refers to boron (B), silicon (Si), germanium (Ge), arsenic (As), selenium (Se), antimony (Sb), tellurium (Te), polonium (Po), and astatine (At).

In a preferable embodiment, the metal element or the semimetal element contained in the oxo acid is preferably an element belonging to groups 3 to 17 in the long-period periodic table of elements, more preferably B, Al, Si, Sc, Ti, V, Cr, Mn, Fe, Co, Ni, Cu, Zn, Ga, Ge, As, Se, Y, Zr, Nb, Mo, Ru, Rh, Pd, Ag, Cd, In, Sn, Sb, Te, La, Ce, Pr, Nd, Sm, Eu, Gd, Tb, Dy, Ho, Er, Tm, Yb, Lu, Hf, Ta, W, Re, Os, Ir, Tl, Pb, Bi, Po, At, Ac, Th, Pa, U, Np, or Pu. A particularly preferable metal element contained in the oxo acid is tungsten (W), molybdenum (Mo), vanadium (V), manganese (Mn), copper (Cu), iron (Fe), aluminum (Al), cobalt (Co), tantalum (Ta), tin (Sn), gallium (Ga), indium (In), zinc (Zn), lead (Pb), or niobium (Nb). A most preferable metal element is tungsten (W) or molybdenum (Mo). A particularly preferable semimetal element contained in the oxo acid is tellurium (Te), germanium (Ge), antimony (Sb), or silicon (Si). A most preferable semimetal element is tellurium (Te).

Specific examples of the oxo acid containing a metal element or a semimetal element are not particularly limited, and include an oxo acid containing the above-described metal element or semimetal element. More specific examples thereof include telluric acid (Te $(OH)_6$), tungstic acid ($H_2WO_4(WO_3.H_2O)$, $H_4WO_5$ ($WO_3.2H_2O$)), molybdic acid ($MoO_3.H_2O$), silicotungstic acid ($H_4$ $[SiW_{12}O_{40}]$), phosphotungstic acid ($H_3$ $[PW_{12}O_{40}]$), metavanadic acid ($HVO_3$), permanganic acid, aluminic acid, stannic acid, germanic acid, and silicic acid. Various polyacids in which a central atom or a metal atom of a polyacid such as the above-described silicotungstic acid or phosphotungstic acid is replaced with another atom may be used as the oxo acid in this embodiment. Two or more kinds of oxo acids may be used in combination.

In the present specification, a concept of the "oxo acid" shall also include a form of a salt or a hydrate thereof.

The salt of the oxo acid is a salt of an anion having structure in which a proton ($H^+$) has been released from the above-described oxo acid and a suitable cation. Examples of the cation constituting the salt of the oxo acid include alkali metals such as sodium and potassium, alkaline earth metals such as calcium, ammonium ion ($NH_4^+$), primary amine, secondary amine, tertiary amine, and quaternary amine. The number of water molecules hydrated with the oxo acid in a hydrate of the oxo acid is not particularly limited. Conventionally known knowledge can be appropriately referenced. When the polishing composition contains a solvent such as water, the oxo acid (salt) is usually present in a form of an ion such as anion. Even in this case, there is no change in that "the polishing composition contains an oxo acid".

The lower limit of the content of the oxo acid in the polishing composition according to the present embodiment is not particularly limited because only a small amount thereof exhibits an effect. However, the content is preferably 0.0001% by mass or more, more preferably 0.0005% by mass or more, particularly preferably 0.001% by mass or more with respect to 100% by mass of the total amount of the polishing composition. The upper limit of the content of the oxo acid in the polishing composition according to the present embodiment is not particularly limited, either. However, the content is preferably 15% by mass or less, more preferably 10% by mass or less, particularly preferably 5% by mass or less with respect to 100% by mass of the total amount of the polishing composition from viewpoints of unit manufacturing cost and a residual property to a polishing object depending on solubility.

Another embodiment of the present invention is a polishing composition including abrasive grains having an average aspect ratio of primary particles of 1.10 or more, and an oxo acid. Such configuration has the effect that surface roughness can be reduced and also scratches can be decreased. In a preferable embodiment of such another embodiment, a pH adjusting agent or the above-described specific additive in the present invention may be included. The abrasive grains having an average aspect ratio of primary particles of 1.10 or more, the pH adjusting agent, the specific additive in the present invention, and the like have been described above. The description is similarly applied here, and detailed description will be omitted.

The polishing composition of the present invention may include other components than those described above, if necessary. Examples thereof may include an etching agent which promotes dissolution of the alloy material, an oxidizing agent which oxidizes the surface of the alloy material, a water-soluble polymer, a copolymer and a salt thereof, and a derivative thereof which act on the surface of the alloy material or the surface of the abrasive grains, an anticorrosive agent and a chelating agent which suppresses corrosion of the surface of the alloy material, a dispersion aid which facilitates redispersion of aggregates of the abrasive grains, and an antiseptic agent and antifungal agent having other functions.

Examples of the etching agent include inorganic acids such as nitric acid, sulfuric acid, and phosphoric acid, organic acids such as acetic acid, citric acid, tartaric acid, and methanesulfonic acid, inorganic alkalis such as potassium hydroxide and sodium hydroxide, and organic alkalis such as ammonia, amine, and quaternary ammonium hydroxide.

Examples of the oxidizing agent include hydrogen peroxide, peracetic acid, percarbonate, urea peroxide, perchloric acid salt, and persulfate.

Examples of the water-soluble polymer, the copolymer and the salt thereof, and the derivative thereof include polycarboxylic acid such as polyacrylate, polyphosphonic acid, a polysulfonic acid such as polystyrene sulfonic acid, polysaccharides such as xanthan gum and sodium alginate, cellulose derivatives such as hydroxyethyl cellulose and carboxymethyl cellulose, polyethylene glycol, polyvinyl alcohol, polyvinyl pyrrolidone, sorbitan monooleate, and an oxyalkylene polymer having one kind or plural kinds of oxyalkylene units.

Examples of the anticorrosive agent include amines, pyridines, a tetraphenylphosphonium salt, benzotriazoles, triazoles, tetrazoles, and benzoic acid. Examples of the chelating agent include carboxylic acid-based chelating agents such as gluconic acid, amine-based chelating agents such as ethylene diamine, diethylene triamine, and trimethyl tetraamine, polyamino polycarboxylic chelating agents such as ethylenediamine tetraacetic acid, nitrilotriacetic acid, hydroxyethyl ethylenediamine triacetic acid, triethylenetetramine hexaacetic acid, and diethylenetriamine pentaacetic acid, organic phosphonic acid-based chelating agents such as 2-aminoethyl phosphonic acid, 1-hydroxyethylidene-1,1-diphosphonic acid, amino tri(methylene phosphonic acid), ethylene diamine tetrakis(methylene phosphonic acid), diethylenetriamine penta(methylene phosphonic acid), ethane-1,1-diphosphonic acid, ethane-1,1,2-triphosphonic acid, methanehydroxy phosphonic acid, and 1-phosphonobutane-2,3,4-tricarboxylic acid, a phenol derivative, and 1,3-diketone.

Examples of the dispersion aid include condensed phosphates such as pyrophosphate and hexametaphosphate. Examples of the antiseptic agent include sodium hypochlorite. Examples of the antifungal agent include oxazolines such as oxazolidine-2,5-dione.

[Method for Manufacturing Polishing Composition]

A method for manufacturing the polishing composition of the present invention is not particularly limited as long as polishing is performed using the polishing composition described above which can be obtained by stirring and mixing silica particles, the additive in the present invention, the pH adjusting agent, and other components, if necessary, in water.

The temperature during mixing the components is not particularly limited, but is preferably 10° C. or higher and 40° C. or lower, and it may be heated in order to increase a dissolution rate. Mixing time is not particularly limited, either.

[Polishing Method and Method for Manufacturing Alloy Material]

As described above, the polishing composition of the present invention is preferably used in polishing an alloy material. Therefore, the present invention provides a polishing method for polishing an alloy material using the polishing composition of the present invention. In addition, the present invention provides a method for manufacturing an alloy material, including a step of polishing the alloy material by the above-described polishing method.

An alloy can be polished using the polishing composition of the present invention with equipment and conditions used in usual metal polishing. As a general polishing apparatus, a single-side polishing apparatus or a double-side polishing apparatus is used. In the single-side polishing apparatus, one surface of an alloy material is polished by pressing a plate to which a polishing cloth is stuck to one surface of a substrate and rotating the plate while the substrate is held with a holder called a carrier and the polishing composition is supplied. In the double-side polishing apparatus, both surfaces of the alloy material are polished by pressing a plate to which a polishing cloth is stuck to the opposite surface of the substrate and rotating the plates in relative directions while the substrate is held with a holder called a carrier and the polishing composition is supplied from above. At this time, the alloy is polished by a physical action by friction between a polishing pad and the polishing composition, and the alloy, and a chemical action brought to the alloy by the polishing composition.

Examples of the polishing conditions in the polishing method according to the present invention include a polishing load. In general, as the load is higher, a friction force due to the abrasive grains is higher, and a mechanical processing force is higher. Therefore, the polishing speed increases. The load in the polishing method according to the present invention is not particularly limited, but is preferably 50 g/cm$^2$ or more and 1,000 g/cm$^2$ or less, more preferably 80 g/cm$^2$ or more and 800 g/cm$^2$ or less, still more preferably 100 g/cm² or more and 600 g/cm² or less per unit area of the substrate. Within this range, a sufficient polishing speed is exhibited, and it is possible to suppress breakage of a wafer due to the load and generation of defects such as scratches on a surface.

Examples of the polishing conditions in the polishing method according to the present invention include a linear velocity in polishing. In general, the rotational number of the polishing pad, the rotational number of the carrier, the size of the substrate, the number of the substrate, and the like affect the linear velocity. When the linear velocity is large, a friction force applied to the substrate becomes large, and therefore an action by which an edge is mechanically polished increases. Friction heat is generated by friction, and a chemical action by the polishing composition may increase. The linear velocity in the polishing method according to the present invention is not particularly limited, but is preferably 10 m/min or more and 300 m/min or less, more preferably 30 m/min or more and 200 m/min or less. Within this range, it is possible to obtain a sufficient polishing speed, and to suppress breakage of the polishing pad due to friction of the substrate. In addition, friction to the substrate is transferred sufficiently, and it is possible to prevent a so-called slipping substrate, and to polish the substrate sufficiently.

Examples of the polishing pad used in the polishing method using the polishing composition of the above embodiment include polishing pads made of different materials such as polyurethane type, non-woven type, and suede type, polishing pads having different physical properties such as hardness and thickness. Examples of polishing pads include polishing pads with or without abrasive grains; however, the use of latter is preferable.

Examples of the polishing conditions in the polishing method according to the present invention include a supplying amount of the polishing composition. The supplying amount is different depending on the kind of the substrate to be polished, the polishing apparatus, and the polishing conditions, but is only required to be a sufficient amount such that the polishing composition is evenly supplied over the entire surface between the substrate and the polishing pad. When the supplying amount of the polishing composition is small, the polishing composition is not supplied to the entire substrate, or the polishing composition is dried and solidified to cause defects on a surface of the substrate in some cases. In contrast, when the supplying amount is large, it is not economical. In addition, friction may be prevented by the excessive polishing composition, particularly by a medium such as water to inhibit polishing.

The polishing method according to the present invention can include a preliminary polishing step using another polishing composition before a polishing step. When processing damage or scratches caused during transportation are present on the surface of the alloy, it takes a lot of time to make these scratches into a mirror surface by a single step. This is not economical, and may impair smoothness disadvantageously. By removing scratches on the surface of the alloy in the preliminary polishing step, it is possible to shorten the polishing time required for polishing by the polishing method according to the present invention, and to expect to obtain an excellent mirror surface efficiently. Hereinafter, a preliminary polishing composition used in the preliminary polishing step will be described.

The preliminary polishing composition used in the preliminary polishing step preferably has a stronger polishing force than the polishing composition used in the present invention. Specifically, abrasive grains having higher hardness and a larger particle size than the abrasive grains used in the polishing composition used in the present embodiment are preferably used.

Examples of the abrasive grains included in the preliminary polishing composition include silicon carbide, aluminum oxide (alumina), zirconia, zircon, ceria, and titania, but are not limited thereto. Among these abrasive grains, aluminum oxide is particularly preferably used. The kind of aluminum oxide is not particularly limited but α-alumina, δ-alumina, θ-alumina, κ-alumina, and other morphologically different ones can be used. In addition, aluminum oxide may contain an impurity element other than aluminum, such as silicon, titanium, iron, copper, chromium, sodium, potassium, calcium, and magnesium.

When the alloy material is a hard and brittle material and is polished at a higher speed, it is preferable to use an alumina containing α-alumina as a main component and having an α forming ratio of 20% or more or 40% or more in a crystalline form of the alumina constituting the alumina abrasive grains. The α forming ratio of alumina referred to here is obtained from an integral intensity ratio of (113) plane diffraction lines by X-ray diffraction measurement.

The average particle diameter of the abrasive grains included in the preliminary polishing composition is preferably 0.1 μm or more, more preferably 0.3 μm or more. A larger average particle diameter of the abrasive grains makes a polishing speed of the alloy material higher.

The average particle diameter of the abrasive grains included in the preliminary polishing composition is preferably 20 μm or less, more preferably 5 μm or less. As the average particle diameter of the abrasive grains is smaller, it is easier to obtain a surface having less defects and a smaller roughness degree. The average particle diameter of the abrasive grains can be measured, for example, using a laser diffraction/scattering particle diameter distribution analyzer, for example, "LA-950" manufactured by Horiba, Ltd.

The specific surface area of the abrasive grains included in the preliminary polishing composition is preferably 20 m²/g or less. A smaller specific surface area of the abrasive grains makes the polishing speed of the alloy material higher. The specific surface area of the abrasive grains included in the preliminary polishing composition is preferably 5 m²/g or more. As the specific surface area of the abrasive grains is larger, it is easier to obtain a surface having less defects and a smaller roughness degree. The specific surface area of the abrasive grains can be measured, for example, using "Flow SorbII 2300" manufactured by Micromeritics Japan.

The content of the abrasive grains in the preliminary polishing composition is preferably 0.5% by mass or more, more preferably 1% by mass or more. A larger content of the abrasive grains makes the speed of polishing the alloy material by the polishing composition higher.

The content of the abrasive grains in the preliminary polishing composition is preferably 20% by mass or less, more preferably 10% by mass or less. As the content of the abrasive grains is smaller, cost for manufacturing the polishing composition is lower, and it is easier to obtain a surface with less scratch by polishing using the polishing composition.

The pH of the preliminary polishing composition depends on the kind of the alloy material to be polished, similarly to the pH of the polishing composition. The pH in the preliminary polishing composition is adjusted by known acid, base, or salt thereof. Particularly, when an organic acid, particularly, glycolic acid, succinic acid, maleic acid, citric acid, tartaric acid, malic acid, gluconic acid, or itaconic acid is used as acid, improvement of the polishing speed can be expected by an action to a surface of the abrasive grains, or the like.

When the alloy material is polished using the polishing composition of the present invention, the polishing composition which has been used once in polishing is collected and can be used in polishing again. One example of a method for reusing the polishing composition includes a method for collecting the polishing composition discharged from the polishing apparatus in a tank and recirculating the polishing composition into the polishing apparatus again. Circular use of the polishing composition is useful in terms of reducing an environmental load by reducing an amount of the polishing composition discharged as wastewater and suppressing manufacturing cost for polishing the alloy material by reducing an amount of the polishing composition used.

When the polishing composition of the present invention is circularly used, a part or all of the silica particles, surfactant, pH adjusting agent, and other additives consumed or lost by polishing can be added as a composition adjusting agent during the circular use. In this case, as the composition adjusting agent, a mixture obtained by mixing a part or all of the silica particles, pH adjusting agent, surfactant, and other additives at any mixing ratio may be used. By adding the composition adjusting agent additionally, the composition is adjusted to a preferable composition for reusing the polishing composition, and polishing is preferably maintained. The concentrations of the abrasive grains, surfactant, and other additives included in the composition adjusting agent are arbitrary, and are not particularly limited, but are preferably adjusted appropriately according to the size of a circulation tank or the polishing conditions.

The polishing composition of the present invention may be a one-liquid type or a multi-liquid type including a two-liquid type. The polishing composition of the present invention may be prepared by diluting a stock solution of the polishing composition with a diluent such as water, for example, 10 times or more.

EXAMPLES

Next, more specific description will be given using Examples and Comparative Examples.

As shown in Table 2, in Examples 1 to 10 and Comparative Examples 1 to 8, a polishing composition was prepared by diluting silica having an average aspect ratio of 1.13 and an average primary particle diameter of 45 nm as a polishing material (abrasive grains) with water, adding a surfactant as an additive, and adjusting the pH to 10.0 with potassium hydroxide. The content of the abrasive grains in the polishing compositions for an alloy material in Examples and Comparative Examples is 20% by mass. The average primary particle diameter of the abrasive grains was measured by calculating from a specific surface area of the polishing material and a density thereof by a BET method measured using "Flow SorbII 2300" manufactured by Micromeritics Japan. The average aspect ratio of primary particles was obtained by calculating an average value of values of 1000 particles measured using a scanning electron microscope S-4700 manufactured by Hitachi High-Technologies Corporation.

A polishing step of polishing aluminum alloys shown in the column "alloy material" in Table 2 using polishing compositions in Examples and Comparative Examples was performed under the conditions shown in Table 3. The surface of the aluminum alloy to be polished is a surface which has been subjected to preliminary polishing so as to have a surface roughness Ra of about 20 nm.

Here, the surface roughness Ra is a calculation average height (Ra) defined by JIS B0601:2001(ISO4287:1997). The "calculation average height" is an average value of absolute values of height at each point of ROI. Ra was measured using a laser microscope VK-X200 manufactured by KEYENCE CORPORATION.

Here, "5052" shown in the column "alloy material" in Table 2 indicates the alloy number 5052 described in JIS H4000:2006, and "6063" indicates the alloy number 6063 described in JIS H4000:2006 (as for the composition, refer to Table 1). The column "molecular weight" in Table 2 indicates a molecular weight of an additive, and the column "addition amount" indicates an addition amount of the additive.

TABLE 1

| Alloy number | Si | Fe | Cu | Mn | Mg | Cr | Zn | Ti | Al | Others (total) |
|---|---|---|---|---|---|---|---|---|---|---|
| A5052 | ≤0.25 | ≤0.40 | ≤0.10 | ≤0.10 | 2.2-2.8 | 0.15-0.35 | ≤0.10 | — | residual | ≤0.15 |
| A6063 | 0.20-0.6 | ≤0.35 | ≤0.10 | ≤0.10 | 0.45-0.9 | ≤0.10 | ≤0.10 | ≤0.10 | residual | ≤0.15 |

(The unit in Table 1 is % by mass.)

<Polishing Speed>

The mass of the alloy material before the polishing step and the mass of the alloy material after the polishing step were measured, and a polishing speed was calculated from a difference in the mass between before and after the polishing step. Results thereof are shown in the column "polishing rate" in Table 2.

<Number of Scratches>

The number of scratches on a polished surface of the alloy material after the polishing step was measured. "The number of scratches" was obtained by visually measuring the number of scratches observed when the polished surface was irradiated with halogen light in a dark room. Results thereof are shown in the column "the number of scratches" in Table 2. The area of the polished surface of the alloy material measured at this time was the entire surface of the polished surface (61 mm×61 mm, one piece).

<Anticorrosive Effect>

A substrate having a surface which had been made as smooth as possible and defects of which were as little as possible (a value of a maximum height (Rz) measured by a laser microscope VK-X200 manufactured by KEYENCE CORPORATION was 150-300 nm) due to polishing was prepared for each of Examples and Comparative Examples.

Each substrate prepared was immersed in each polishing composition at 50° C. for 16 hours, and taken out and washed. A maximum height of the surface of the substrate after washing was measured by the same apparatus as above.

A value ΔRz was calculated by reducing a maximum height of the surface of the substrate measured in advance before the immersion from the maximum height of the surface of the substrate after washing. A smaller difference ΔRz between before and after the immersion indicates a higher anticorrosive effect. Results thereof are shown in the column "ΔRz" in Table 2. The value Rz indicates a maximum height defined by JIS B0601:2001 (ISO4287:1997).

All of the alloy materials which had been polished by the polishing compositions in Examples had excellent smoothness.

TABLE 2

| | Alloy material | Additive (surfactant) | Molecular weight | Addition amount [% by mass] | Polishing speed [μm/min] | The number of scratches | ΔRz |
|---|---|---|---|---|---|---|---|
| Comparative Example 1 | A 5052 | — | — | — | 0.11 | 40 | 115 |
| Comparative Example 2 | A 6063 | — | — | — | 0.12 | 35 | 112 |
| Example 1 | A 5052 | polyoxyethylene decyl ether (EO: 5) | 378 | 0.20 | 0.10 | 4 | 0 |
| Example 2 | A 6063 | polyoxyethylene decyl ether (EO: 5) | 378 | 0.20 | 0.10 | 4 | 0 |
| Example 3 | A 5052 | polyoxyethylene decyl ether (EO: 7) | 466 | 0.25 | 0.10 | 8 | 0 |
| Example 4 | A 6063 | polyoxyethylene decyl ether (EO: 7) | 466 | 0.25 | 0.10 | 7 | 0 |
| Example 5 | A 5052 | polyoxyethylene dodecyl ether (EO: 9) | 582 | 0.31 | 0.10 | 9 | 0 |
| Example 6 | A 6063 | polyoxyethylene dodecyl ether(EO: 9) | 582 | 0.31 | 0.10 | 8 | 0 |
| Example 7 | A 5052 | polyoxyethylene dodecyl ether (EO: 21) | 1110 | 0.59 | 0.10 | 9 | 0 |
| Example 8 | A 6063 | polyoxyethylene dodecyl ether (EO: 21) | 1110 | 0.59 | 0.10 | 9 | 0 |
| Example 9 | A 5052 | polyoxyethylene docosyl ether (EO: 20) | 1206 | 0.64 | 0.10 | 20 | 0 |
| Example 10 | A 6063 | polyoxyethylene docosyl ether (EO: 20) | 1206 | 0.64 | 0.10 | 17 | 0 |
| Comparative Example 3 | A 5052 | copolymer of ethylene oxide and propylene oxide (EO: 160, PO: 30) | 9000 | 0.20 | 0.10 | 35 | 102 |
| Comparative Example 4 | A 6063 | copolymer of ethylene oxide and propylene oxide (EO: 160, PO: 30) | 9000 | 0.20 | 0.10 | 31 | 101 |
| Comparative Example 5 | A 5052 | polyethylene glycol | 400 | 0.20 | 0.10 | 36 | 120 |
| Comparative Example 6 | A 6063 | polyethylene glycol | 400 | 0.20 | 0.10 | 33 | 122 |
| Comparative Example 7 | A 5052 | polyvinyl alcohol (saponification degree: 98% or more and 99% or less, polymerization degree: 200) | 9000 | 0.20 | 0.10 | 33 | 125 |
| Comparative Example 8 | A 6063 | polyvinyl alcohol (saponification degree: 98% or more and 99% or less, polymerization degree: 200) | 9000 | 0.20 | 0.10 | 31 | 120 |

TABLE 3

| Polishing conditions | |
|---|---|
| Polishing machine | single-side polishing machine (plate diameter 380 mm) |
| Polishing pad | suede type |
| Polishing load | 175 g/cm² |
| Rotational number of plate | 90 rpm |
| Linear velocity | 71.5 m |
| Polishing time | 10 minutes |
| Supplying speed of polishing composition | 14 ml/min |
| Polishing object | 61 mm × 61 mm, one piece |

As shown in Table 2, the numbers of scratches in Examples 1 to 10 were smaller than those in Comparative Examples 1 to 8. Values of Rz in Examples were lower than those in Comparative Examples. This result indicates that it is possible to obtain a high-quality mirror surface which exhibits an anticorrosive effect and has significantly reduced scratches or the like on the surface of the alloy material in Examples. In addition, it is possible to maintain a high polishing speed sufficiently with respect to the alloy material. On the other hand, the additives in Comparative Examples 3 to 8 did not (sufficiently) exhibit an anticorrosive effect due to adsorption to the surface of the alloy. Therefore, a scratch suppressing effect was not sufficient.

The present application is based on the Japanese patent application No. 2013-166945 filed on Aug. 9, 2013. The disclosed contents thereof are referred to and incorporated here as a whole.

The invention claimed is:

1. A polishing method for polishing an alloy material using a polishing composition wherein the polishing composition comprises:

abrasive grains; and
an additive which does not form a complex with specific metal species and is adsorbed on a surface of the alloy to exhibit an anticorrosive effect and
the additive is represented by the following formula (I):

$$Z\text{—}O\text{-}(AO)_nH \tag{I},$$

wherein Z is a hydrophobic portion, and the hydrophobic portion is a substituted or unsubstituted alkyl group or aryl group having a carbon number of 5 or more and 15 or less,
A is an alkylene group having a carbon number of 1 or more and 3 or less,
n is an integer of 1 or more and 50 or less and
wherein a main component of the alloy material is at least one member selected from the group consisting of aluminum, titanium, iron, nickel, and copper.

2. The polishing method for polishing an alloy material according to claim 1, wherein the abrasive grains are made of silica.

3. The polishing method for polishing an alloy material according to claim 1, wherein an average aspect ratio of primary particles of the abrasive grains is 1.10 or more.

4. The polishing method for polishing an alloy material according to claim 1, wherein the main component of the alloy material is at least one member selected from the group consisting of aluminum, iron, and nickel.

5. The polishing method for polishing an alloy material according to claim 1, wherein the main component of the alloy material is aluminum.

6. The polishing method for polishing an alloy material according to claim 1, wherein the main component of the alloy material is aluminum, and comprises at least one member of metal element selected from the group consisting of silicon, magnesium, iron, copper, and zinc at a content of 0.5% by mass or more and 20% by mass or less with respect to a total amount of the alloy material.

7. A method for manufacturing an alloy material, comprising a step of polishing by the polishing method according to claim 1.

* * * * *